(12) United States Patent
Yang et al.

(10) Patent No.: US 8,362,949 B2
(45) Date of Patent: Jan. 29, 2013

(54) GPS AND MEMS HYBRID LOCATION-DETECTION ARCHITECTURE

(75) Inventors: Qingxuan Yang, Beijing (CN); Edward Chang, Palo Alto, CA (US); Guanfeng Li, Fremont, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/169,711

(22) Filed: Jun. 27, 2011

(65) Prior Publication Data

US 2012/0326922 A1 Dec. 27, 2012

(51) Int. Cl.
*G01S 19/48* (2010.01)
(52) U.S. Cl. .................................. 342/357.31; 701/472
(58) Field of Classification Search ............... 342/357.3, 342/357.31, 357.32, 357.74; 701/472
See application file for complete search history.

(56) References Cited

U.S. PATENT DOCUMENTS

| | | | |
|---|---|---|---|
| 6,240,367 B1* | 5/2001 | Lin | 701/472 |
| 8,072,379 B2* | 12/2011 | Gopinath | 342/357.74 |
| 2008/0004796 A1 | 1/2008 | Schott et al. | |
| 2008/0262730 A1 | 10/2008 | Onome et al. | |
| 2009/0009397 A1 | 1/2009 | Taylor et al. | |
| 2009/0058723 A1* | 3/2009 | Mao | 342/357.13 |
| 2009/0132164 A1* | 5/2009 | Goodall et al. | 701/213 |
| 2009/0278738 A1 | 11/2009 | Gopinath | |
| 2009/0315767 A1* | 12/2009 | Scalisi et al. | 342/357.07 |
| 2010/0005885 A1 | 1/2010 | Peters et al. | |
| 2011/0175772 A1* | 7/2011 | Sambongi | 342/357.3 |
| 2011/0309976 A1* | 12/2011 | Leclercq et al. | 342/357.25 |

OTHER PUBLICATIONS

Welch, G., et al., "An Introduction to the Kalman Filter", SIGGRAPH, University of North Carolina at Chapel Hill Department of Computer Science, Aug. 12-17, 2001, pp. 1-47, Coure 8, ACM, Inc., Chapel Hill, NC.
Mayback, P., "Stochastic Models, Estimation, and Control", Department of Electrical Engineering Air Force Institute of Technology Wright-Patterson Air Force Base Ohio, 1979, pp. 1-2, vol. 1, Academic Press, New York, NY.
"Ultralow Power Digital Accelerometer ADXL346", Analog Devices, 2010, pp. 1-40, Analog Devices, Inc., Norwood, MA.
Office Action dated Jan. 20, 2012, issued in related U.S. Appl. No. 13/244,970.
Final Office Action dated May 3, 2012, issued in related U.S. Appl. No. 13/244,970.
Korean IPO, "PCT—Notification of the International Search Report and the Written Opinion of the International Searching Authority, or the Declaration," International Appln. No. PCT/US2012/044015, Date of Mailing—Nov. 30, 2012; with PCT International Search Report and PCT—Written Opinion of the International Searching Authority, 9 pages.

* cited by examiner

*Primary Examiner* — Gregory C Issing
(74) *Attorney, Agent, or Firm* — Sterne, Kessler, Goldstein & Fox PLLC

(57) ABSTRACT

The present application describes a computer-implemented method and system for obtaining position information for a moving mobile device with increased accuracy and reduced power consumption. The subject of the present application combines information from a GPS location sensor with information from MEMS devices such as an acceleration detector and a gyroscope using statistical analysis techniques such as a Kalman filter to estimate the location of the device with greater accuracy while using numerical methods such as the Newton-Raphson Method to minimize power consumption. Minimizing power consumption is possible because GPS signals sampled at a lower rate can conserve power, while GPS sampled at a lower rate and working together with MEMS devices can achieve the same level of location prediction accuracy as a GPS alone sampled at a higher rate.

28 Claims, 11 Drawing Sheets

GPS AND MEMS HYBRID LOCATION-DETECTION ARCHITECTURE

BACKGROUND

1. Field

The present field relates to a real-time location detection system, which uses MEMS and GPS sensors to achieve high location-prediction accuracy while conserving energy.

2. Related Art

Real-time location-detection allows for many location-based applications such as store finding, transit routing, and ads targeting. In outdoor environments, GPS and cell-tower signals are typically used for detecting the location of mobile devices. However, cell-tower signals may not provide highly accurate or precise information about location. and GPS signals may not be available when satellite signals are obstructed, such as when the mobile device is in or near a building. Moreover, receiving and processing GPS signals may consume substantial energy and hence shorten battery duration.

In addition to GPS sensors, some mobile devices are equipped with MEMS (Microelectromechanical Systems) sensors. MEMS sensors are typically very small mechanical devices which are driven by electricity. Various types of MEMS sensors include accelerometers, digital compasses, functional sensors, gyroscopes, and inertial modules. MEMS sensors can provide information about the movement of a mobile device. For example, they provide information about acceleration or the orientation of an object by generating electrical signals that correspond with dynamic forces, such as user movement of the device, or static forces such as gravity that act on the device.

Current technology may use either GPS or cell-tower signals to determine location. However, GPS signal receiving and processing consumes significant power, and cell-tower signals can provide prediction with only about 300-meter accuracy, or 50-meter accuracy at best. To improve accuracy and power consumption, some aircraft employ several GPS antennas to determine location information. However, because of the much smaller size of a mobile device (compared to an aircraft), the multiple-antenna approach may not be possible, because the length of GPS signal phase is longer than a mobile device. Moreover, mobile devices require highly precise location information to be optimally useful and power is limited, because most mobile devices obtain their power from a battery. Furthermore, moving patterns of mobile devices may not be as "smooth" as an aircraft.

BRIEF SUMMARY

Embodiments relate to providing accurate location information for a moving device. A goal of the embodiments is to provide the accurate location information while minimizing power consumption. According to an embodiment, a system for providing accurate location information for a moving mobile device includes a location sensor, coupled to the mobile device, that determines an absolute location of the mobile device at a first time. The system also includes an acceleration detector, coupled to the mobile device, that determines an acceleration magnitude of the mobile device at a time after the first time and before a second time occurring after the location sensor determines the absolute location. The system further includes a movement direction detector, coupled to the mobile device, that determines a direction of movement of the mobile at a time after the first time and before the second time. The system also includes a signal fusion module that determines updated location information of the mobile device based on the acceleration magnitude and direction of movement, The updated location information determined as relative to the absolute location and representing the location of the mobile device at the second time more accurately than the absolute location that is determined by the location sensor.

According to another embodiment, a computer-implemented method provides accurate location information for a moving mobile device. The method includes: (1) determining, using a location sensor coupled to the mobile device, an absolute location of the mobile device at a first time; (2) determining, using an acceleration detector coupled to the mobile device, an acceleration magnitude of the mobile device at a time after the first time and before a second time occurring after the location sensor determines the absolute location; (3) determining, using a movement direction detector coupled to the mobile device, a direction of movement of the mobile device at a time after the first time and before the second time; and (4) determining updated location information of the mobile device based on the acceleration magnitude and direction of movement, the updated location relative to the absolute location, the updated location information representing the location of the mobile device at the second time more accurately than the absolute location that is determined by the location sensor.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. The accompanying drawings, that are incorporated herein and form a part of the specification, illustrate the subject of the present application and, together with the description, further serve to explain the principles of the present application and to enable a person skilled in the pertinent art to make and use the subject of the present application.

In the drawings, like reference numbers may indicate identical or functionally similar elements. The drawing in which an element first appears is generally indicated by the left-most digit in the corresponding reference number.

DETAILED DESCRIPTION OF EMBODIMENTS

Systems and methods are needed to provide more accurate location detection in areas where GPS may be obscured, such as in or near buildings. A further important goal is to reduce power consumption while maintaining accurate location detection. To achieve these goals, the present embodiments describe a GMHLD (GPS/MEM Hybrid Location-Detection) Architecture.

In the detailed description of embodiments that follows, references to "one embodiment", "an embodiment", "an example embodiment", etc., indicate that the embodiment described may include a particular feature, structure, or characteristic, but every embodiment need not necessarily include the particular feature, structure, or characteristic. Moreover, such phrases do not necessarily refer to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
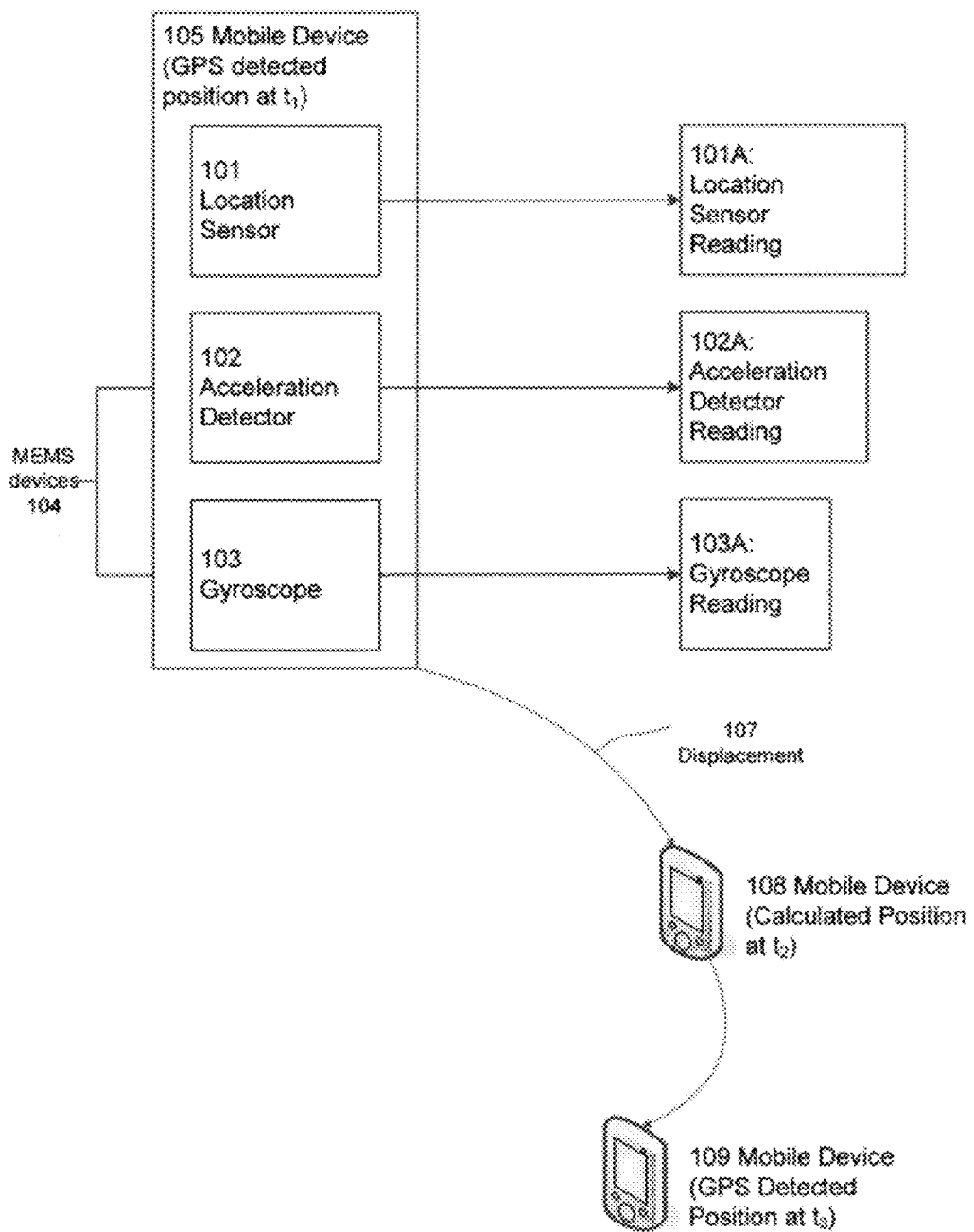
FIG. 1A shows a diagram illustrating an example mobile device that uses information from a location sensor, an acceleration detector, and a gyroscope to estimate the mobile device's location as it moves, according to an embodiment.

FIG. 1A shows a diagram 100 illustrating determining a location of a mobile device moving over time. Diagram 100 illustrates a mobile device at three points in time. The mobile device is at a position 105 at time $t_1$, a position 108 at $t_2$, and position 109 at $t_3$. The mobile device includes a location sensor 101, an acceleration detector (e.g. accelerometer) 102, and a gyroscope 103. The gyroscope 103 is an example of a MEMS sensor 104 that can serve as a motion direction detector, although other types of MEMS sensors 104 may serve in this role.

Embodiments, as illustrated in FIG. 1A, combine data from a location sensor 101 and MEMS devices 104, such as a MEMS acceleration detector 102 and a MEMS gyroscope 103. By combining data from the location sensor 101 and MEMS devices 104, embodiments may determine location with enhanced accuracy in areas where the sensor output signals received from the location sensor 101 may be obscured. Such improved accuracy is possible because the MEMS devices 104 may detect movement of the mobile between times when the location sensor 101 samples the location of the mobile device. These sensor signals 215 may include as an acceleration detector reading 102A and a gyroscope reading 103A. The sensor signals 215 may be characteristic of the motion of the mobile device after the location sensor 101 has determined its location sensor reading 101A. The MEMS devices 104 may enable the location sensor 101 to sample less frequently. Less frequent sampling results in reduced power consumption and lengthened battery life.

While an acceleration detector 102 and a gyroscope 103 are shown in FIG. 1 for illustrative purposes, a person of skill in the art would recognize that any other type of MEMS device 104 that provides information about the changes over time in the motion and/or position of the mobile device. Such improvements would include any methods of improving the accuracy of a location calculation as would be apparent to an ordinarily skilled artisan.

Figure 8:
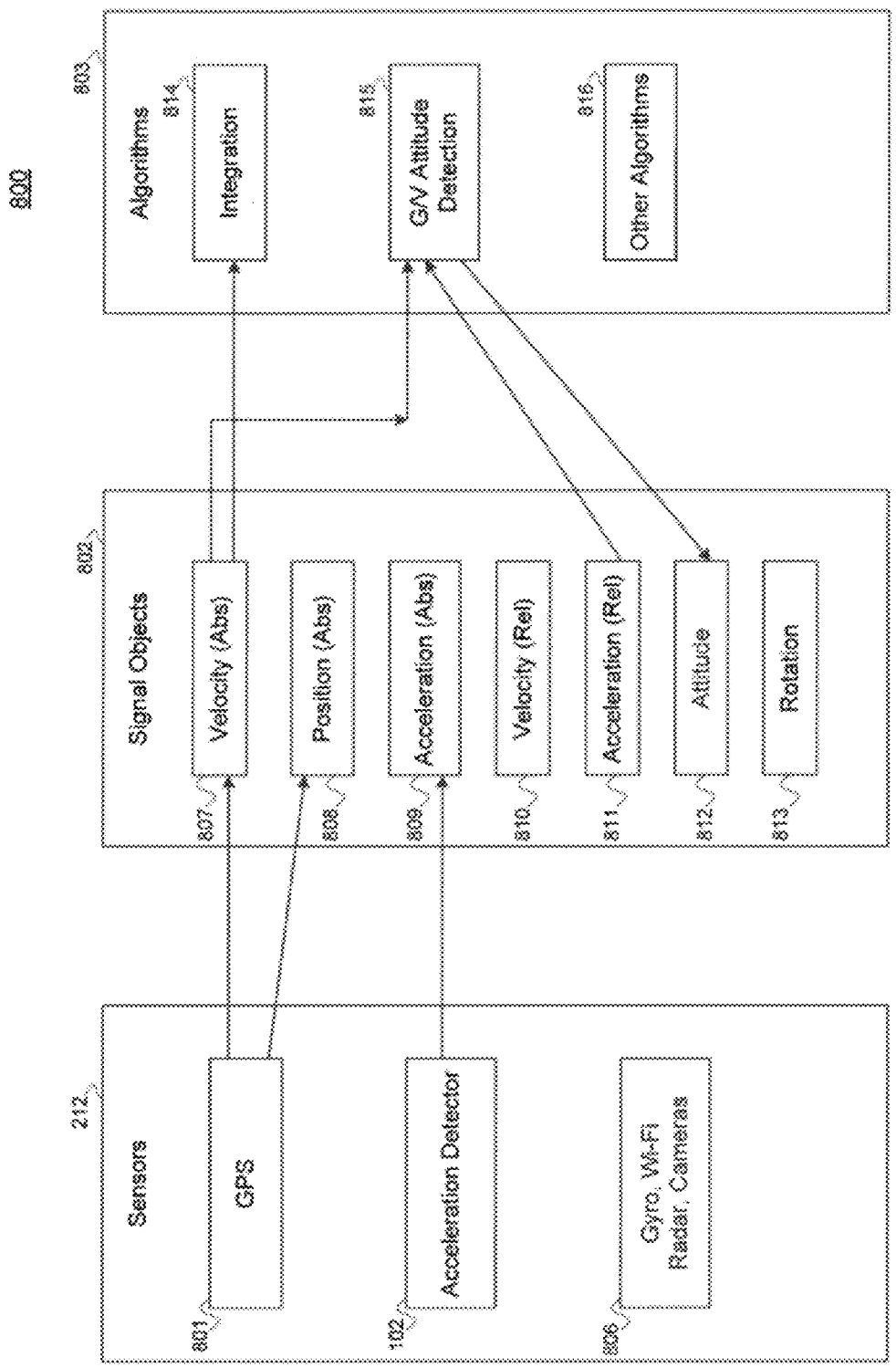
FIG. 8 is a diagram illustrating a system that uses sensors to provide information on signal objects and how the signals are mathematically analyzed to determine location information, according to an embodiment.

Location sensor 101 may, for example, be a GPS sensor, a location sensor 101 that calculates positions by using signals from cell phone signal towers, or any other sensor that uses any combination of information to generate an absolute position or an absolute velocity, such as an absolute position 808 and in absolute velocity 807 in FIG. 8, sensor signals 215 as they change for the mobile device over time.

The mobile device in diagram 100 receives information from location sensor 101, acceleration detector 102, and gyroscope 103. This information consists of a location sensor reading 101A, an acceleration detector reading 102A, and a gyroscope reading 103A. This set of information allows the mobile device to estimate the mobile device's location over time. At $t_1$, location sensor 101 determines the location of the mobile device. In the embodiment where location sensor 101 is a GPS receiver, location sensor 101 may sample signals from one or more GPS satellites and may determine the location of the mobile device based on those signals. Using that information, location sensor 101 determines that the mobile device to be at position 105.

After location sensor 101 determines the position of the mobile device, the mobile device illustrated in diagram 100 moves in accordance with any momentum it may possess, as modified by any acceleration it is subject to. As the mobile device moves, the acceleration detector 102 and gyroscope 103 may determine an acceleration detector reading 102A and a gyroscope reading 103A. Acceleration detector reading 102A may include an acceleration magnitude, and the acceleration magnitude may be used to determine a speed of movement of the mobile device at a time between $t_1$ and $t_2$ by numerical integration. The acceleration detector reading 102A is corrected for gravity as described below in the discussions of FIG. 6 and FIG. 7.

Gyroscope reading 103A may include a direction of movement of the mobile device at a time between $t_1$ and $t_2$. Based on the speed and direction, the mobile device may determine a displacement 107 from position 105 to determine a new position 108. In an embodiment, position 108 may be determined by statistically analyzing the location sensor reading 101A, the acceleration detector reading 102A, and the gyroscope reading 103A by using a Kalman filter. In another embodiment, the position 108 may twice integrate an acceleration vector over the time from t1 to t2. The acceleration vector may be determined from acceleration detector reading 102A (as the vector's magnitude) and the gyroscope reading 103A (as the vector's direction). In other examples, various readings may be corrected for gravity or other factors. Position 108 more accurately represents the position of the mobile device at time $t_2$ than that indicated by the location sensor reading 101A. Further embodiments and examples for determining an updated position is explained below in greater detail.

After additional time passes, location sensor 101 may again determine a location sensor reading 101A at $t_3$ to determine that the mobile device is at position 109. By using intervening readings from the acceleration detector 102 and the gyroscope 103, the embodiment can determine the mobile device's 105 position between times $t_1$ and $t_3$ and thereby continue to update and maintain the location of the mobile device.

In other words, the location sensor 101 may sample the location of the mobile device less frequently when MEMS device 104 data is available. This result is possible because the mobile device now has a way of establishing its position between times when the location sensor 101 establishes the location of the mobile device. Sampling using the location sensor 101 less frequently may save power as illustrated in FIG. 1B.

Figure 1B:
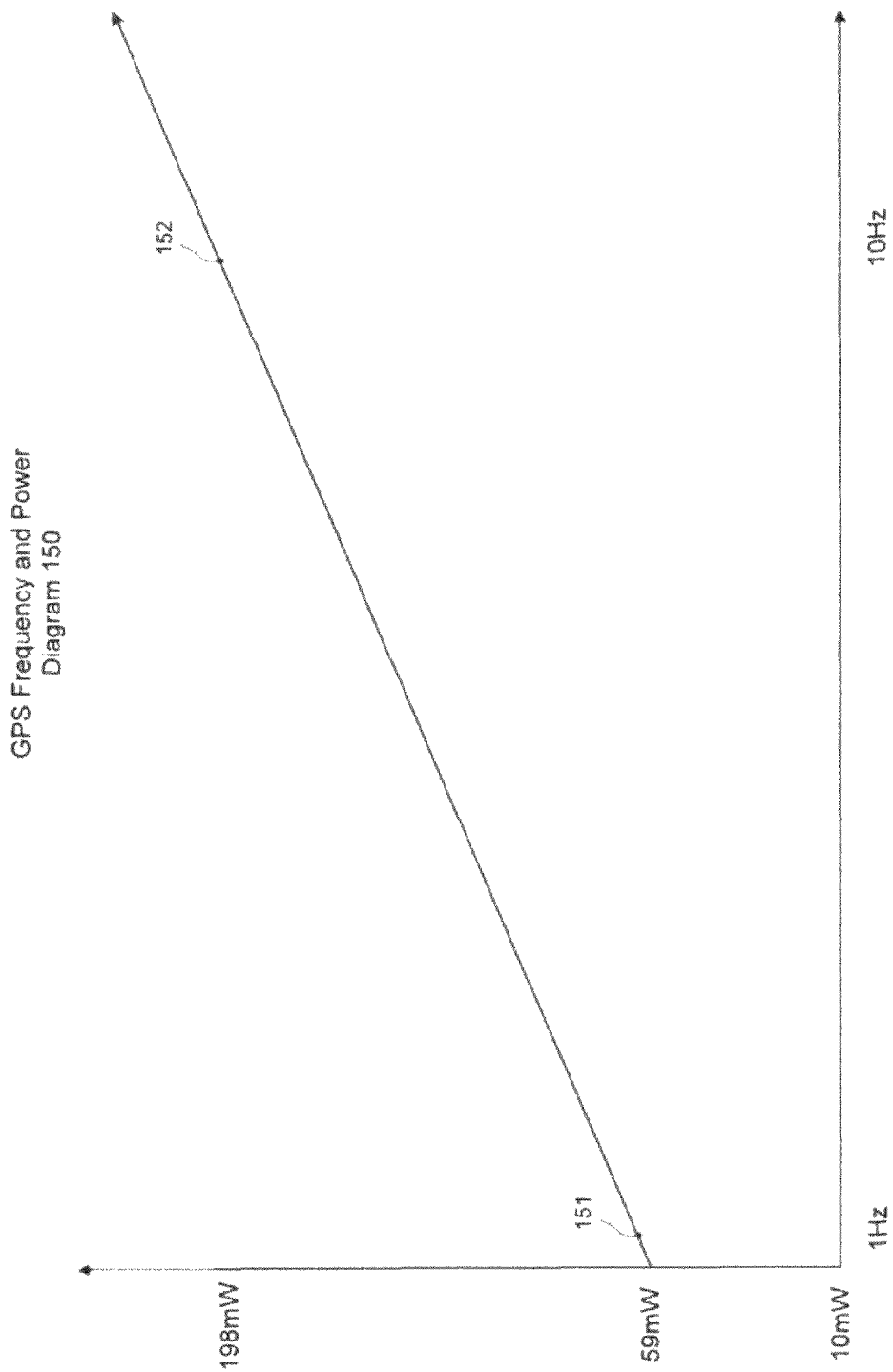
FIG. 1B is a graph of the power consumption for a GPS device given different sampling frequencies.

FIG. 1B is a graph 150 of the power consumption for an example GPS sensor, the SIRFSTAR GPS sensor available from SWF Technology Inc, of San Jose, Calif. Graph 150 illustrates that the power consumption of the GPS sensor corresponds to the frequency at which the GPS sensor samples the location of the mobile device 150. At point 152, the GPS sensor may sample the location of the mobile device at 10 Hz and may consume approximately 198 mW of power. While a certain minimum amount of power is necessary to operate the GPS, as sampling becomes more frequent, the power drawn increases proportionally as sampling increases. Minimizing power consumption is possible because GPS signals sampled at a lower rate can conserve power, while GPS sampled at a lower rate and working together with MEMS devices can achieve the same level of location prediction accuracy as a GPS alone sampled at a higher rate.

In an embodiment, MEMS sensors 104, such as an acceleration detector 102 and a gyroscope 103, may be used to help determine the location of the mobile device, as described for example, with respect to FIG. 1A. Because other sensors are used, the location sensor 105 may sample less frequently, reducing its power consumption in manner as shown in FIG. 1B. As illustrated at point 151 in graph 150, the GPS sensor may determine the mobile device's location at 1 Hz and consume only about 59 mW of power, by contrast to the 198 mW required to sample at 10 Hz.

The MEMS sensors may consume far less power than the GPS sensor. In this way, using of the information from the acceleration detector 102 and the gyroscope 103 in FIG. 1A, the mobile device may accurately determine its position while using approximately three-tenths of the power.

Figure 2:
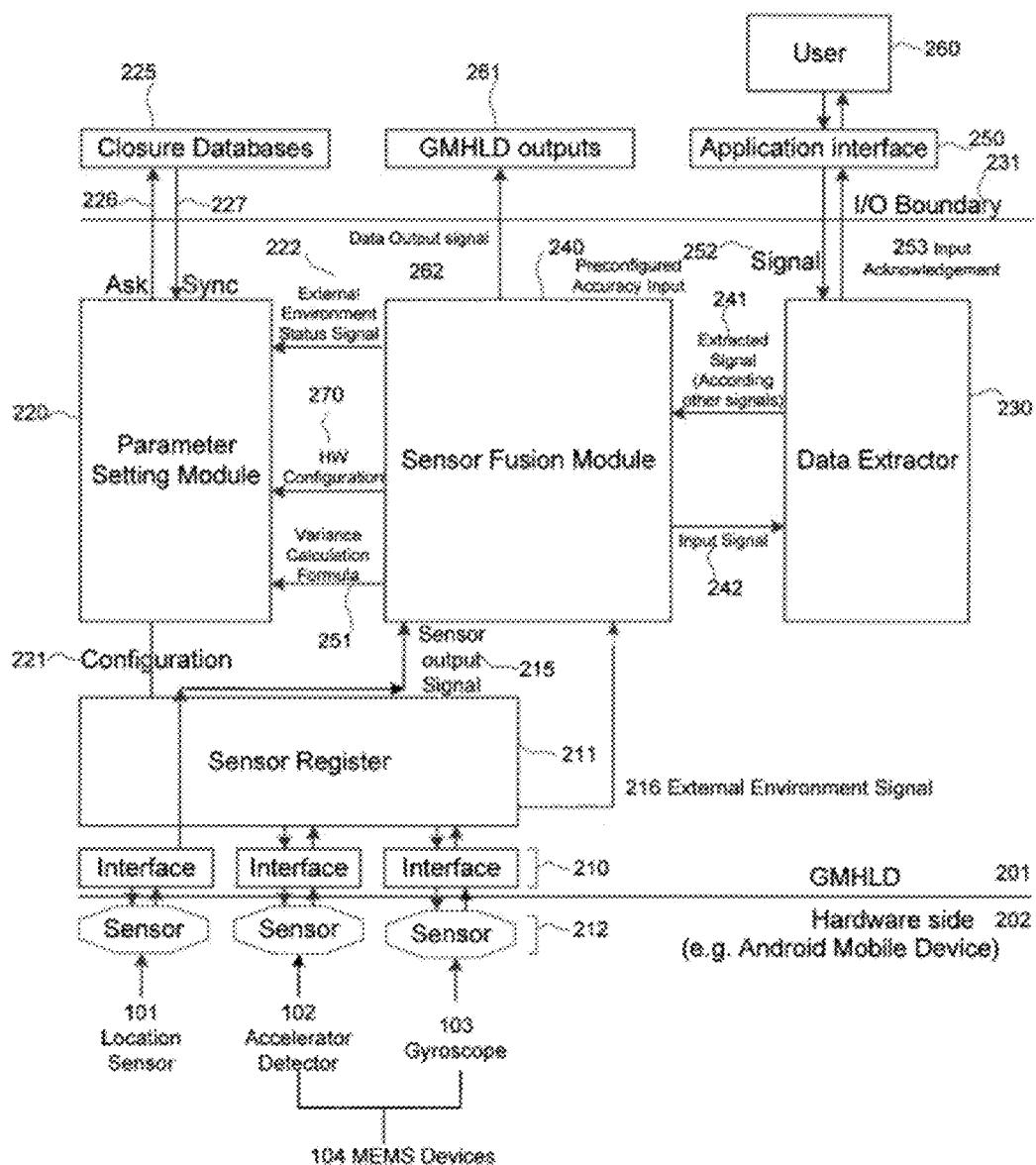
FIG. 2 is a diagram of a system for providing accurate location information for a mobile device while conserving energy, according to an embodiment.

FIG. 2 is a diagram of a system 200 for providing accurate location information for a mobile device while conserving energy, according to an embodiment of the subject of the present application. An exemplary embodiment of system 200 may be deployed on an Android mobile device. As illustrated, system 200 includes a series of modules, each of which acts to provide specific functionality. These modules may include code which is stored in a memory which is then executed on a processor to provide the functionality, hardware which is adapted to provide the module's functionality, firmware or any combination of hardware, firmware and software working together to provide the functionality of the module.

To utilize the location sensor 101, which as noted previously may be a GPS location sensor, and the MEMS sensors 104, embodiments may adjust the configuration 221 of the sensors 212 by using a configuration 221 that is determined in a parameter setting module 220 and transmitted via a sensor register 211 to set sensors 212 via a set of interfaces 210. A configuration 221 adjusts parameters of the sensors in a manner that allows location to be determined to a preconfigured accuracy input 252. For example, a parameter might be sampling rate, power allocation, or another setting of one of the sensors 212 that influences the accuracy of the signals 215 that they provide to a sensor fusion module 240. The sensor fusion module, after receiving signals 215, combines them in tandem with a data extractor 230 to provide a GMHLD output signal 262 as GMHLD outputs 261 that are improved location estimates for the mobile device.

The preconfigured accuracy input 252 is set by the user 260 using an application interface 250 to provide a data extractor module 230 with preconfigured accuracy input 252. The data extractor in turn acknowledges the changed preconfigured accuracy input 252 to the user 260 via an application interface 250 across an I/O boundary 231 as an input acknowledgement 253. The mobile device can then use analysis techniques as described below to determine settings of the sensors that provide a location estimate as GMHLD outputs 261 in accordance with a given preconfigured accuracy input 252. More information about how the sensor 212 settings are initially set and then refined is provided below.

In an example, embodiments may use the sensors 212 to, for example, determine an external environment signal 216 indicative of the external environment of the mobile device, such as whether the mobile device is indoors or outdoors. The sensors transmit 212 information via their interface 210 to a sensor register 211. The sensor register 211 then communicates them as sensor signals to the sensor fusion module 215. Sensor fusion module 240 in turn transmits the information from the sensor signal 215 to the data extractor 230 as an input signal 242 for preliminary analysis and filtering. The preliminary analysis and filtering performed by the data extractor 230 are described in conjunction with FIG. 6 and FIG. 7, below.

After the data extractor 230 has analyzed the data contained in the input signal 242, it returns the results of its analysis as an extracted signal 241 to the sensor fusion module 240. For example, a strong signal might indicate that the location sensor 101 is operating outdoors, while a weak signal could indicate indoor operation. The sensor fusion module 240 takes the information about which sensors are available and whether the device is indoors or outdoors and transmits it to the parameter setting module 220 as an environment status signal 222, to be used in the parameter setting module' 220's determination of an optimized power configuration 221

For example if there is limited information available from the location sensor 101, such as if the mobile device determines that it is indoors, the selected sensor configuration parameters may reduce the sampling of the GPS sensor and rely more heavily on the acceleration detector reading 102A and gyroscope reading 103A to determine the location of the mobile device.

A sensor register 211 produces the external environment signal 216 as well as the sensor output signal 215 from the sensors 212 via the interface modules 210. Based on the external environment signal 216, embodiments may select a configuration 221 that specifies a set of sensor configuration parameters optimized as per the external environment signal 216 by the parameter setting module 220. This optimization process occurs through the interaction of the data extractor 230, the sensor fusion module 240, and the parameter setting module 220, and is described in greater detail below.

GMHLD 201 may operate between hardware sensors 202 and user application interfaces 250 over an I/O boundary 231 by using modules to process sensor output signals 215 and an external environment signal 216 and yield GMHLD outputs 261 in accordance with settings selected by the user 260. Between GMHLD 201 and sensors 212, GMHLD 201 may use a sensor register 211, which may use multiple sensor interface modules 210 to communicate with one or more sensors 212. These sensors may include location sensors 101, MEMS sensors 104, and any combination thereof, as well as any other type of sensor that may provide a signal that contains information that can be used to improve the accuracy of an estimate of the location of the mobile device. The sensor interface modules 210 are coupled to a sensor register 211. The sensor register receives information from the sensors 212 via the interface modules 210 and performs preliminary analysis to generate two signals: a sensor output signal 215 and an external environment signal 216. The sensor register then communicates the sensor output signal 215 and the external environment signal 216 to the sensor fusion module 240 for further analysis.

Sensor output signal 215 includes the information which reflects readings from the sensors, such as the location sensor reading 101A, the acceleration detector reading 102A, and the gyroscope reading 103A illustrated in FIG. 1A. The external environment signal 216 indicates what the surroundings of the mobile device are (e.g., indoors or outdoors) as well as information about which location sensor 101 and MEMS devices are available 104 and what their operational parameters are including information such as signal frequency and power levels.

Sensor interface modules 210 convey signals from the sensors 212 to store information from sensors 212 in the sensor register 211. The sensor register 211 may include a memory that stores a record of at least some of the information provided by the sensors 212 via the sensor interface modules 210 and may store information about settings for the sensors 212. The settings may include sensor operational parameters, as described above. The sensor register 211 receives information from a parameter setting module 220, which determines a configuration 221 including operational parameter settings for the location sensor 101 and MEMS devices 104 that will allow GMHLD to determine location with sufficient accuracy. The operation of the parameter setting module is discussed in greater detail in conjunction with FIG. 4 and FIG. 5, below.

In an exemplary embodiment, system 200 may be an ANDROID smartphone, and interface 210 may be an ANDROID interface. Sensor register and sensors 210 may provide the sensors 212 with a configuration 221. Configuration 221 may include power limit and sensor-dependent parameters to drive the sensors. In response to receipt of configuration 221, sensors 212 gather information as specified by the configuration 221. The information is then conveyed via the interface modules 210 to be stored in the sensor register 211. For example, a location sensor 101 may provide a signal with information about latitude and longitude of the mobile device. Given multiple readings, information about velocity may also be available. An MEMS acceleration detector 102 may provide a vector with information about the magnitude and, possibly, a direction of a force that the device experiences. A gyroscope 103 may also provide information about orientation of the mobile device and the direction of movement. GMHLD 201 may change sensor configuration 221 via these interface modules 210, based upon the parameter setting module, which is described below.

The sensor register 211 transmits the sensor output signal 215 and the external environment signal 216 to the data extractor module 230 as an input signal 242 via the sensor fusion module 240. The data extractor module uses filters that perform preliminary transformations of individual sensors' components of the sensor output signal 215 (GPS, MEMS, or another type of sensor) and uses the raw signal information to extract information which can be used by the sensor fusion module 240 to provide a location estimate 262 as a GMHLD output 261. For example, the signal sensor output 215 may include information about attitude determination (i.e., a MEMS gyroscope's 103 signal) and coarse location prediction (from a location sensor 101). GMHLD also supports an interface which can send and receive external, augmented signal sensor output 215 from applications (e.g., the location of a nearby store) via the application interface 250. In short, the data extractor module 230 manages all individual sensor and non-sensor location signals and may mine the signals for information which is relevant to the mobile device's location. Operation of data extractor module 230 is illustrated with respect to FIGS. 6 and 7.

Figure 6:
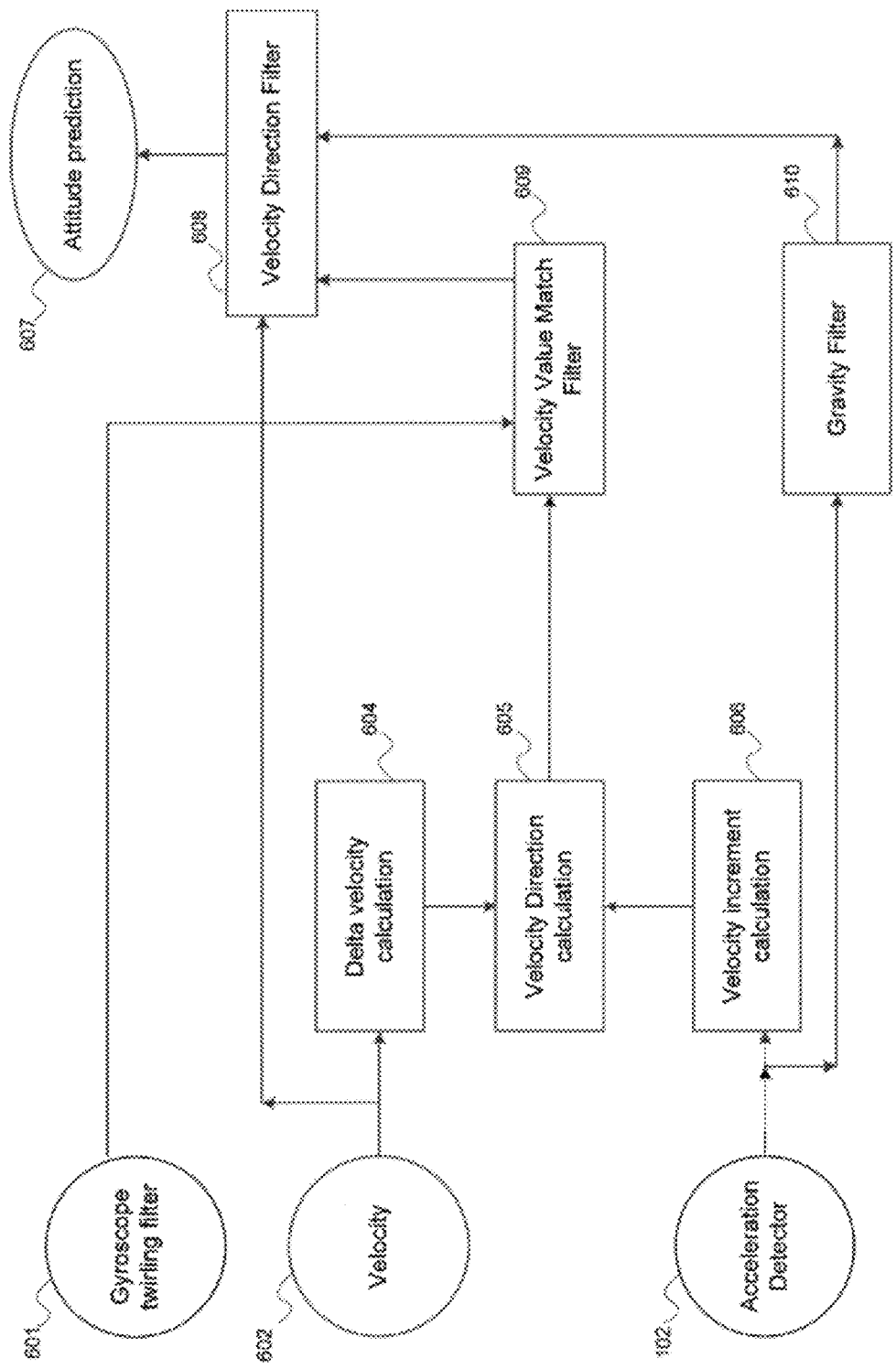
FIG. 6 is a flowchart diagram that shows a method for transforming gyroscope data, velocity, and acceleration detection information to predict a moving mobile device's location, according to an embodiment.
Figure 7:
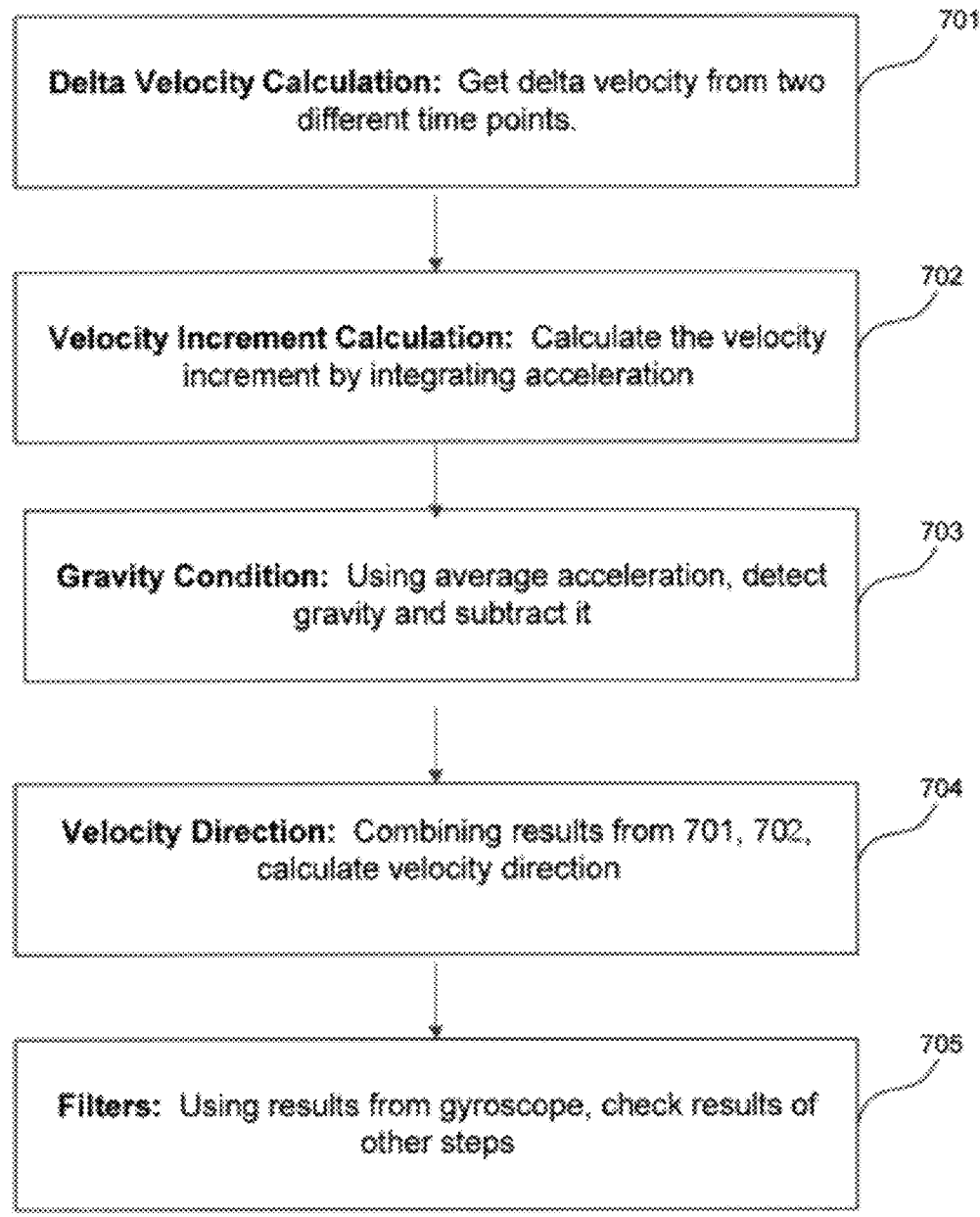
FIG. 7 is a flowchart diagram that shows a method for correcting acceleration data for the effects of gravity to predict a moving mobile device's location, according to an embodiment.

FIG. 6 is a diagram that shows a processing pipeline that may occur at data extractor module 230 to transform gyroscope, velocity, and acceleration information to predict a moving mobile device's 105 location. As illustrated in FIG. 6, data extractor module 230 has several parallel components. Each one supports one type of signal information. The data extractor module 230 uses algorithms that can be employed to assist computing different parameters for predicting a location. FIG. 7 is a flowchart diagram that shows an example operation of data extractor module 230 to correct acceleration data for the effects of gravity to predict a moving mobile device's location. The method of FIG. 7 may be executed in conjunction with the processing architecture of the subject of the present application in accordance with FIG. 6.

Referring to FIG. 7, the mobile device gets delta velocity from two different time points at step 701. Step 701 may correspond with the step of using velocity 602 information to find a delta velocity calculation 604 in FIG. 6. In step 702, the mobile device calculates the speed increment by integrating acceleration. This step corresponds with velocity increment calculation 606 of the results of the acceleration detector 102 in FIG. 6. In step 703, using average acceleration, the mobile device detects gravity as a constant at the Earth's surface and subtracts its effects. This step corresponds step corresponds with the gravity filter 610 of the results of the acceleration detector 102 in FIG. 6. In step 704, combining the results from 701, 702, the mobile device calculates velocity direction calculation 606. This step corresponds with velocity direction calculation 605 of the results of the delta velocity calculation 604 and the velocity increment calculation 606 in FIG. 6. In step 705, using results from the gyroscope, the mobile device checks results of the other steps with filters. This step corresponds with the velocity value filter 609 that combines the results of the velocity direction filter 605 and the gyroscope twirling filter 601 in FIG. 6. The results of the velocity match filter 609 is then combined with the velocity 602 data and the results of the gravity filter 610 to yield a result that is processed by a velocity direction filter 608 to yield an attitude prediction 607 result as per FIG. 6.

Explaining FIG. 6, in greater detail, in this context, velocity is a vector. As with all vectors, velocity has a direction and a magnitude, which is speed. From the location detector 101, we can get Velocity 602 readings (in low frequency). From a series of Velocity 602 readings we can get a Delta Velocity calculation 604 by finding a difference between the current reading and last reading. From the acceleration detector 102 we can get a series readings of acceleration with high frequency. We can calculate the Velocity increment 606 from an integral of acceleration detector 102 readings. Combining the Velocity increment 606 with the Delta Velocity 604 we got from the location sensor readings allows inference of Velocity Direction 605.

The reading from the gyroscope 103A contains lots of small noises, so some embodiments use a "gyroscope twirling filter" 601 (which may be an appropriate smoothing filter known in the art) to get rid of them and provide filtered gyroscope readings 103A. We then use the results of the gyroscope twirling filter 601 combined with the velocity direction calculation 605 to pass through the "Velocity Value Match Filter" 609 to refine better Velocity direction signal.

Every accelerometer reading contains the acceleration due to gravity. A "Gravity Filter" 610 subtracts the acceleration of Gravity component from the acceleration detector reading 102A, yielding the mobile device's 105 movement acceleration. Note this acceleration has both a value and a direction in the absolute coordination system since the acceleration due to gravity is always pointing to the center of the earth and with a value of roughly 9.8 m/s$^2$. That acceleration, combined with the velocity reading 602 from the location sensor 101 and the velocity from the Velocity match filter 809, pass through the Velocity direction 608 filter where they are added together, yielding the attitude of the mobile device 105 in the absolute coordination system 607.

Referring back to FIG. 2, the data extractor module 230 reads the input signal from sensor fusion module 240 and extracts data from it as described above. Data extractor module 230 can use the relationship between sensors output, such as the location sensor reading 101A, the acceleration detector reading 102A, and the gyroscope reading 103A to compute more information about a mobile device's motion. Typically, to be useful the data extractor 230 algorithm requires multiple types of signals. It also supports an application interface 250, which can use an external algorithm (e.g., machine learning) as a data extraction algorithm.

The sensor output signals 215 may include seven types of motion signal objects 802 in FIG. 8, which are analyzed to determine how they reflect the mobile device's location. These signal objects 802 are described in further detail in FIG. 8 and FIG. 9, below. For example, a relative acceleration signal 611 can be filtered to indicate the direction of the gravity (see steps 610 and 703). However, under an absolute coordinate system, gravity's acceleration is always downwards. Thus, one can get the attitude signal by use of the acceleration signal (see steps 607 and 705). With gyroscopes 103, one can determine more information about a mobile device's 105 attitude and compute its moving direction and distance in the absolute coordinate system.

After the data extractor module 230 has completed its analysis, the extracted signals 241, which contain information about the mobile device's changes in position, attitude, and movement, are sent to the sensor fusion module 240 in combination with at least the location sensor reading 101A.

The sensor fusion module 240 may be the core for effectively combining all the available signals so as to conserve energy. The extracted signals 241 from the data extractor 230 are combined with the sensor output signal 215 and the external environment signal 216 to create a highly accurate signal. While the specific calculations used to obtain the estimate are discussed in conjunction with the discussion of estimates provided by Kalman filters, below, the overall operation of the signal fusion module 240 is summarized here.

Available signals are provided from the sensor register 211 and the data extractor modules 230. The sensor fusion module 240 also provides a variance calculation formula 251, as will be discussed below, for the parameter setting module 220. The sensor fusion module begins by using the extracted signals 241 from the data extractor 230 with the sensor output signal 215 and the external environment signal 216 from the sensor register and the preconfigured accuracy input signal 252 to adapt a variance calculation formula 251 (as discussed below) to the present operating environment of the GMHLD system 201.

When some sensor output signals 215 are significantly strengthened or weakened, sensor fusion module 240 triggers an event to the parameter setting module 220. Parameter setting module 220 will determine if it is proper to make a change to the configuration 221, using a closure database 225, if it is available. The operation of the parameter setting module is discussed below with respect to FIG. 4 and FIG. 5.

As described above, the sensor fusion module 240 receives position, movement, attitude signals from the data extractor module 230 and the sensor register 211. Using these signals, signal fusion module 240 determines and outputs a fused, improved signal. It should be recognized that the fusion process may use a Kalman filter to fuse the signals and manage variance, but any other statistical algorithm which combines multiple imprecise estimates of a value and yields a more precise estimate may be used. An example operation of sensor fusion module 240 using a Kalman filter is discussed below.

Several other embodiments of the subject of the present application offer improvements over the basic implementation of the subject of the present application. For example, one may use DGPS (differential GPS) to increase the precision of the RTLS (real-time location system), and GPS receiver improvement may also take that advantage. One can also support real time location broadcasts or RF signals at some important places for mobile usages. That will greatly increase the RTLS location system's precision at these places.

Some alternative algorithm may also take the same functions, such as Wi-Fi location determination, CP2P, 3D information extraction and so on.

Each of said pieces of stored information may be any stored type of structured memory, including a persistent memory. In examples, the information may be implemented as variables in memory, files on a disk, or pieces of information in a database.

System 200 may be implemented on any type of mobile device, including a mobile phone, smartphone or tablet computing device. Further, a mobile device can include, but is not limited to, a device having a processor and memory for executing and storing instructions. Software may include one or more applications and an operating system. Hardware can include, but is not limited to, a processor, memory and graphical user interface display. A mobile device may accept user input using, for example, a thumb keyboard or touch screen. The mobile device may also have multiple processors and multiple shared or separate memory components.

Figure 3:
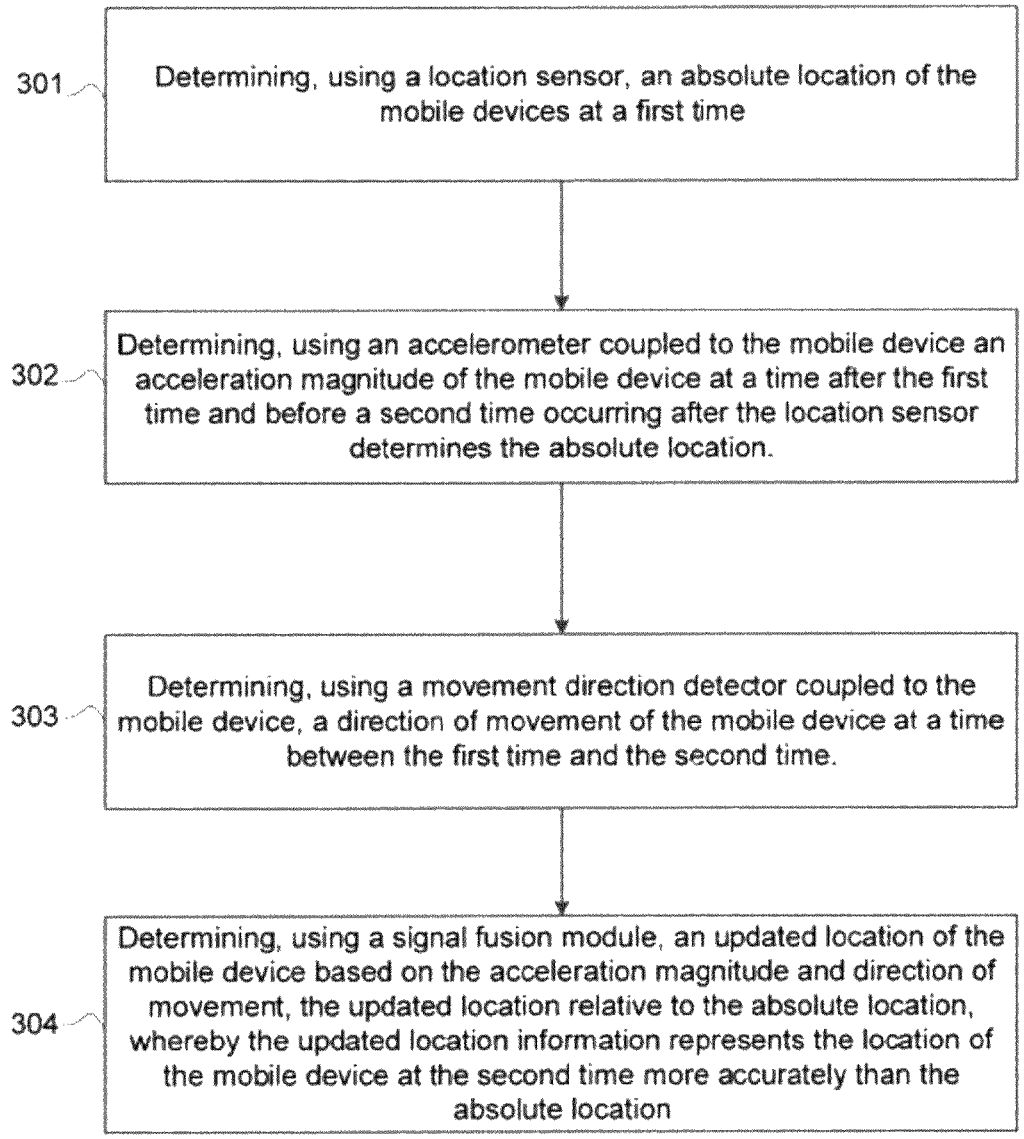
FIG. 3 is a flowchart diagram that shows a method for providing accurate location information for a mobile device while conserving energy, according to an embodiment.

FIG. 3 is a flowchart diagram that shows the primary steps involved in a computer-implemented method embodiment of the subject of the present application. In step 301, the mobile device determines, using a location sensor 101 coupled to the mobile device, an absolute location of the mobile device at a first time. In step 302, the mobile device determines, using an acceleration detector 102 coupled to the mobile device, an acceleration magnitude of the mobile device at a time after the first time and before a second time occurring after the location sensor determines the absolute location. In step 303, the computerized mobile device determines, using a movement direction detector (e.g., gyroscope) 103 coupled to the mobile device, a direction of movement of the mobile device at a time after the first time and before the second time. In step 304, the mobile device determines an updated location 108 of the mobile device based on the acceleration magnitude and direction of movement, the updated location relative to the absolute location, the updated location information 108 representing the location of the mobile device at the second time 108 more accurately than the absolute location.

Figure 4:
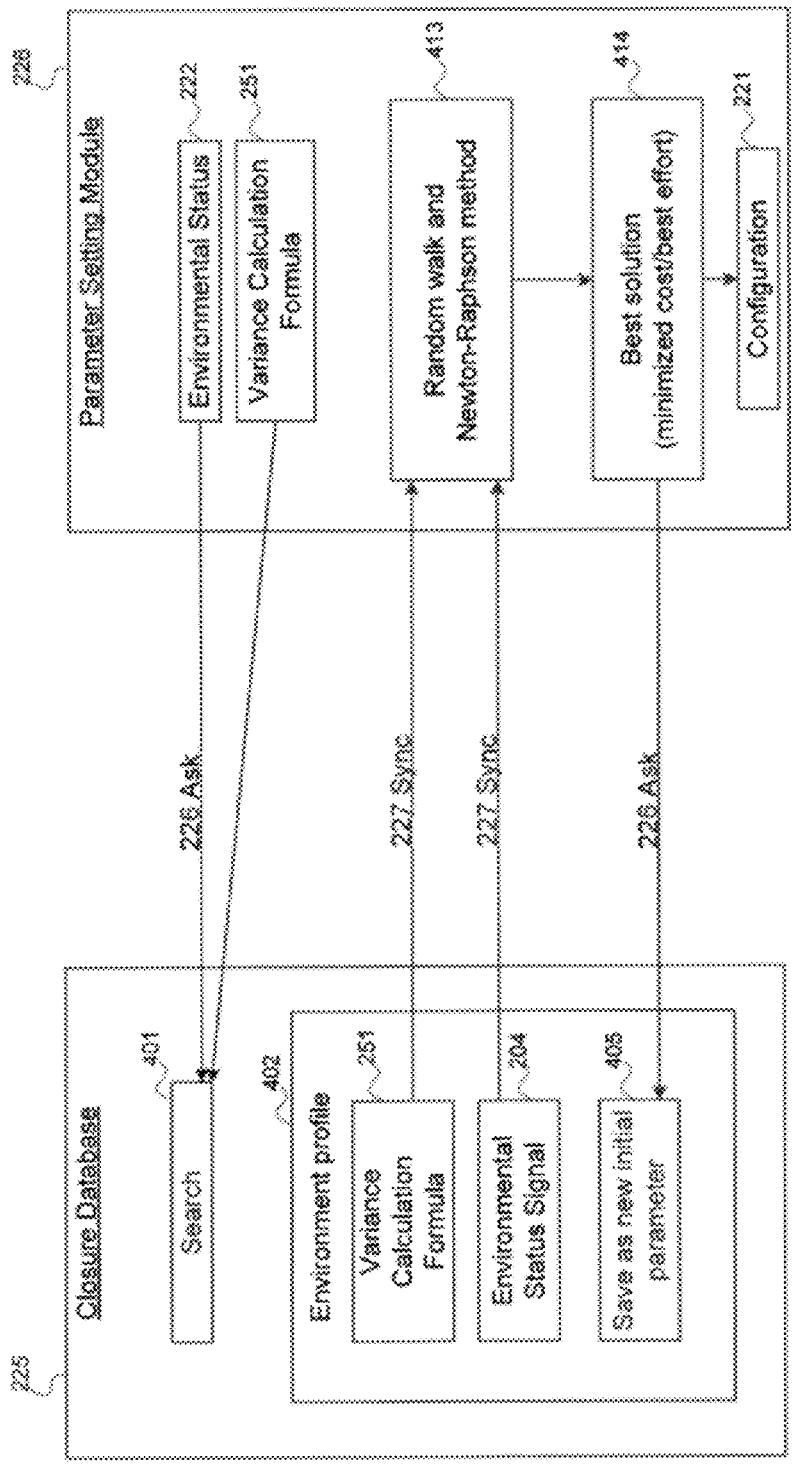
FIG. 4 is a diagram of a system that uses sensor signals, a closure database, and Newton's Method to optimize power use while determining a moving mobile device's location, according to an embodiment.

FIG. 4 is a diagram of a parameter settings module 220 that uses sensor output signal 215, a closure database 225, and Newton's Method to optimize power use while determining a moving mobile device's location.

A parameter setting module 220 may receive information about how to set the sensor parameters at the sensor register 211 based on hardware and location environment (e.g., indoor, outdoor, availability of signals, sensor type and parameter configuration) as an environment status signal 222 from the sensor fusion module 240 and a variance calculation formula 251 from the sensor fusion module 240 that reflects the preconfigured accuracy input 252 of the GMHLD outputs 261. The sensor fusion module 240 derives the environment status signal 222 and a variance calculation formula 251, and also GMHLD outputs 261 of a determined location of the mobile device, by using extracted signal 241 information from the data extractor 230 in combination with the sensor output signal 215 and the external environment signal 216 from the sensor register 211.

The parameter setting module 220 may dynamically allocate resources for sensors 212, adjusting sensor parameters in configuration 221 provided to the sensor register 211. The environment status signal 222 is discussed above, and provides information that can be introduced into the variance calculation formula 251 as provided by the signal fusion module to determine a configuration 221 for the sensor register 211 that will provide a sensor output signal 215 that will provide enough information to correspond with the preconfigured accuracy input 252. The input from sensor fusion module 240 may include an external environment status signal 222 with hardware configuration (e.g., what sensors 212 are available and what types of information they provide) and external environment information (e.g., indoor or outdoor), and a preconfigured accuracy input 252. In an embodiment, the preconfigured accuracy input signal 252 may be specified by a user 260 via an application interface 250 such as, for example, a mobile device system configuration parameter.

In another embodiment, the preconfigured accuracy input 252 may be pre-configured on the mobile device. Parameter setting module 220 then determines a resource and power allocation plan. Parameter setting module 220 specifies the resource and power allocation plan as a configuration 221. Parameter setting module 220 transmits configuration 221 to interface modules 210, which in turn transmit the configuration 221 to the sensors 212. Configuration 221 causes the sensors 212 to provide sensor output signals 215 that will provide sufficient information to produce an estimated location which satisfies the variance calculation formula 251. In this way, parameter setting module 220 configures sensors 212 both to optimize and produce signals to comply with the accuracy requirement.

The parameter setting module 220 begins with said configuration information 221 and uses it to develop a configuration 221 using the following Cost Manage Algorithm of integrated position detection.

Figure 5:
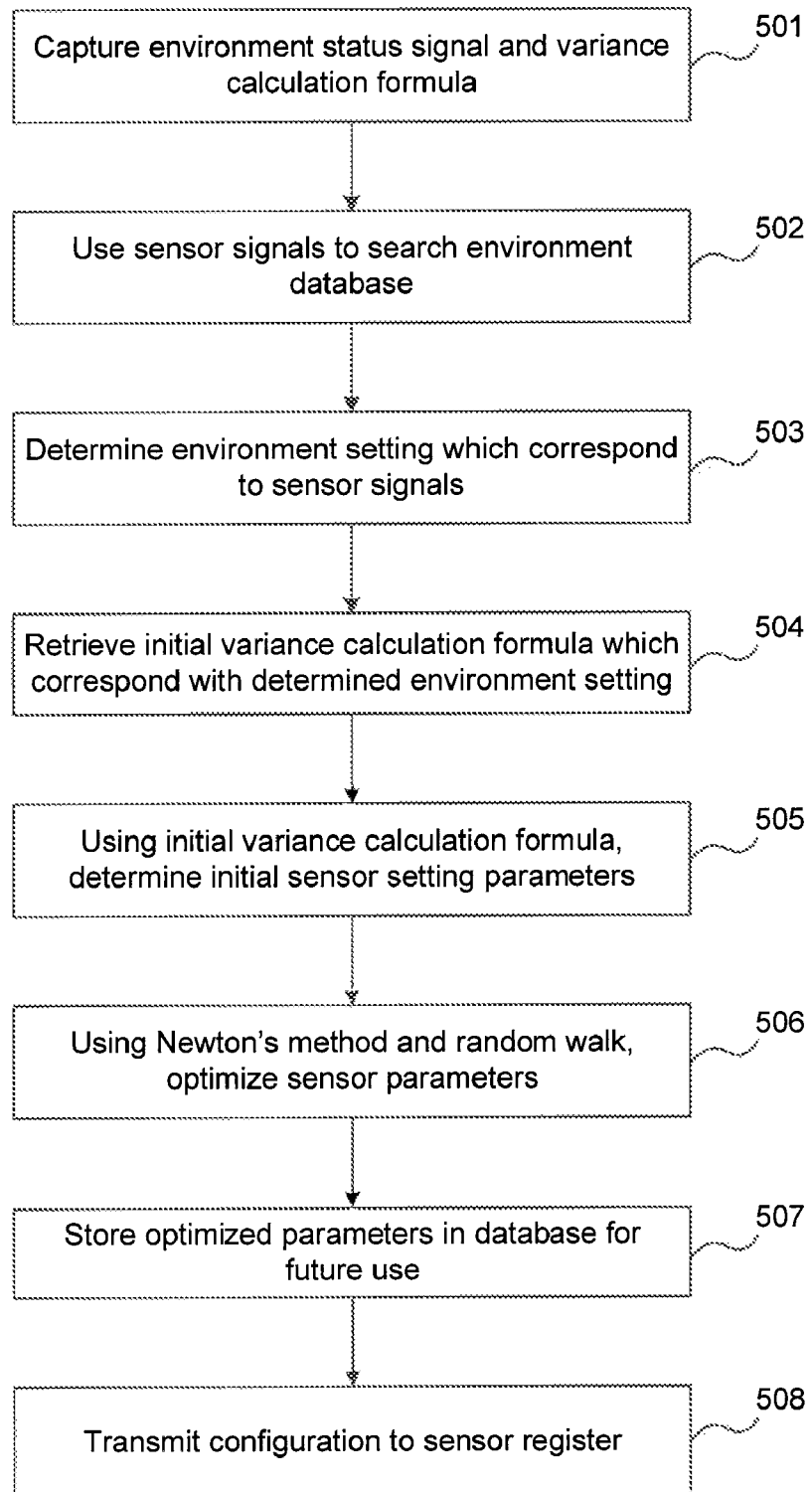
FIG. 5 is a flowchart diagram that shows a method for determining a mobile device's location, which may be used in the operation of the system of FIG. 2.

The parameter setting module 220 determines the resource allocation plan by a heuristic algorithm, given a system configuration as depicted in FIG. 4 and using the steps provided in FIG. 5. Power optimization occurs through use of a parameter setting module 220 in conjunction with a closure database 225. The closure database 225 receives an ask 226 request consisting of an environment status signal 222 and a variance calculation formula 251. The environment status signal 222 and a variance calculation formula 251 act as a query that specify an environment profile 402 to search 401 the closure database 225. This retrieves sync data 227 which is saved as new initial parameter 405 the minimized cost/best effort that the database 225 has previously stored.

The parameter setting module 220 then uses the random walk and Newton-Raphson method 413 to improve iteratively power consumption by introducing new configuration 221 values of sensor parameters, which a module of the environment database 400 then saves for subsequent usage 405. The Newton-Raphson method in combination with random walk 413 is repeated until a minimum power configuration 221 is achieved by using the derivatives of the relationship between changing power allocations and precision to minimize iteratively power configuration for a environment status signal 222 and variance calculation formula 251. The Newton-Raphson method in combination with random walk 413 yield a best solution 414 (minimized cost/best effort) that can then be implemented as a configuration 221 by the sensor register 211.

FIG. 5 is a flowchart diagram that shows the primary steps involved in optimizing power usage while determining a moving mobile device's 100 location. This method may be executed on an exemplary system embodiment of the subject of the present application in accordance with FIG. 4. In step 501, the mobile device captures the sensor signal output 215 and 216. In step 502, the mobile device uses sensor signals to search environment database 225. In step 503, the mobile device determines environment status settings 222 which correspond to sensor signals. In step 504, the mobile device retrieves initial variance calculation formula 251 which correspond with the determined environment status settings 222. In step 505, using initial variance calculation formula 251, the mobile device determines initial sensor setting parameters. In step 506, using Random walk and Newton-Raphson method 413, the mobile device optimizes sensor parameters to minimize power usage. In step 507, the mobile device stores the best solution 414 in the closure database 225 for future use. In step 508, the configuration is transmitted to the sensor register 211 to reconfigure the sensors 212.

FIG. 8 is a diagram of a system embodiment 800 that uses sensors 212 to provide information signal objects that are characteristic of the position and motion of a moving mobile device and how the signals are mathematically analyzed. The system consists of sensors 212, signal objects 802, and algorithms executed by the system 803. The sensors include a GPS 101 which may operate using a single antenna, an acceleration detector 102, which may be a MEMS device, and other MEMS devices 806 such as a gyroscope 103, a wi-fi receiver, radar, or cameras which may provide information that the system 800 can use to provide information about the signal objects. The signal objects consists of velocity (absolute) 807, position (absolute) 808, acceleration (absolute) 809, velocity (relative) 810, acceleration (relative) 811, attitude (812), and rotation (813).

As example, the GPS 101 may provide information about the velocity (absolute) 807 and position (absolute) 808 signal objects 802. The acceleration detector 102 can provide information about the acceleration (absolute) 809 signal object 802.

The system 800 then processes the information from the signal objects 802 in accordance with the algorithms 803. For example, velocity (absolute) 807 may be integrated 814 to yield position information 808, and velocity (absolute) 807 and acceleration (relative) 811) may be processed using a g/v (gravity) attitude detection 815 algorithm that corrects for gravity to determine attitude 812. Other algorithms 816 may process the signal objects 802 to determine more information.

Figure 9:
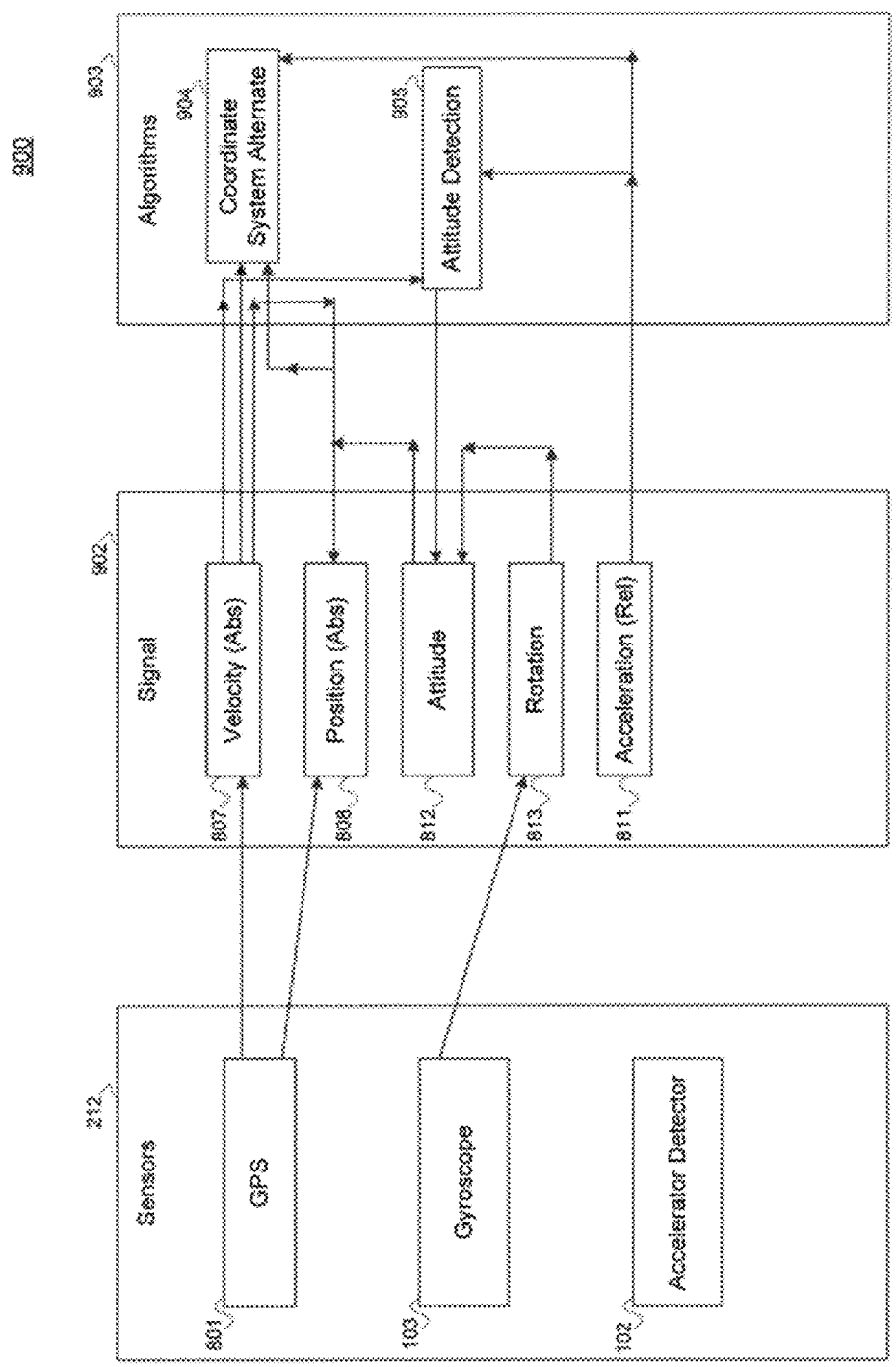
FIG. 9 is a diagram illustrating a system that uses a GPS, an acceleration sensor, and a gyroscope to provide information to signal objects and how the signals are mathematically analyzed to determine location information, according to an embodiment.

FIG. 9 is a diagram of a system 900 that uses sensors 212 to provide information signal objects 902 that are characteristic of the position and motion of a moving mobile device and how the signal objects 902 are mathematically analyzed, where the sensors 212 include a GPS 101, a gyroscope 103, and an acceleration detector 102. These sensors provide velocity (absolute) 807, position (absolute) 808, attitude 812, rotation, and acceleration (relative) 811 information.

Preliminary processing of the location sensor reading 101A, acceleration detector reading 102A, and gyroscope reading 103A may proceed as described in the discussion FIG. 4 and FIG. 5 above at the data extractor 230 to provide the sensor fusion module 240 with information to derive information about the signal objects 902.

Algorithms 903 process the information from the sensors 212 in combination with the extracted signal 241 from the data extractor 230 to yield information about the signal objects 902 such that:

1. A coordinate system alternate 904 operates on information from the attitude 812 (derived by the data extractor) and acceleration (relative) 811 (from the acceleration detector 102) to yield information about the velocity (absolute) 807 signal object 902

2. Information from the velocity (absolute) 807 signal object 902 (from step 1) yields information about the position (absolute) 808 signal object 902 (derived by numerical integration).

3. An attitude detection algorithm 905 operates on the velocity (absolute) 807 (from step 1) and acceleration (relative) 811 (from the accelerometer) signal objects 902 to yield information about the attitude 812 signal object 902 (see FIG. 5 and FIG. 6).

4. Information from the rotation 813 (from the gyroscope) signal object 902 yields information about the attitude 812 signal object 902 (see FIG. 5 and FIG. 6)

Figure 10:
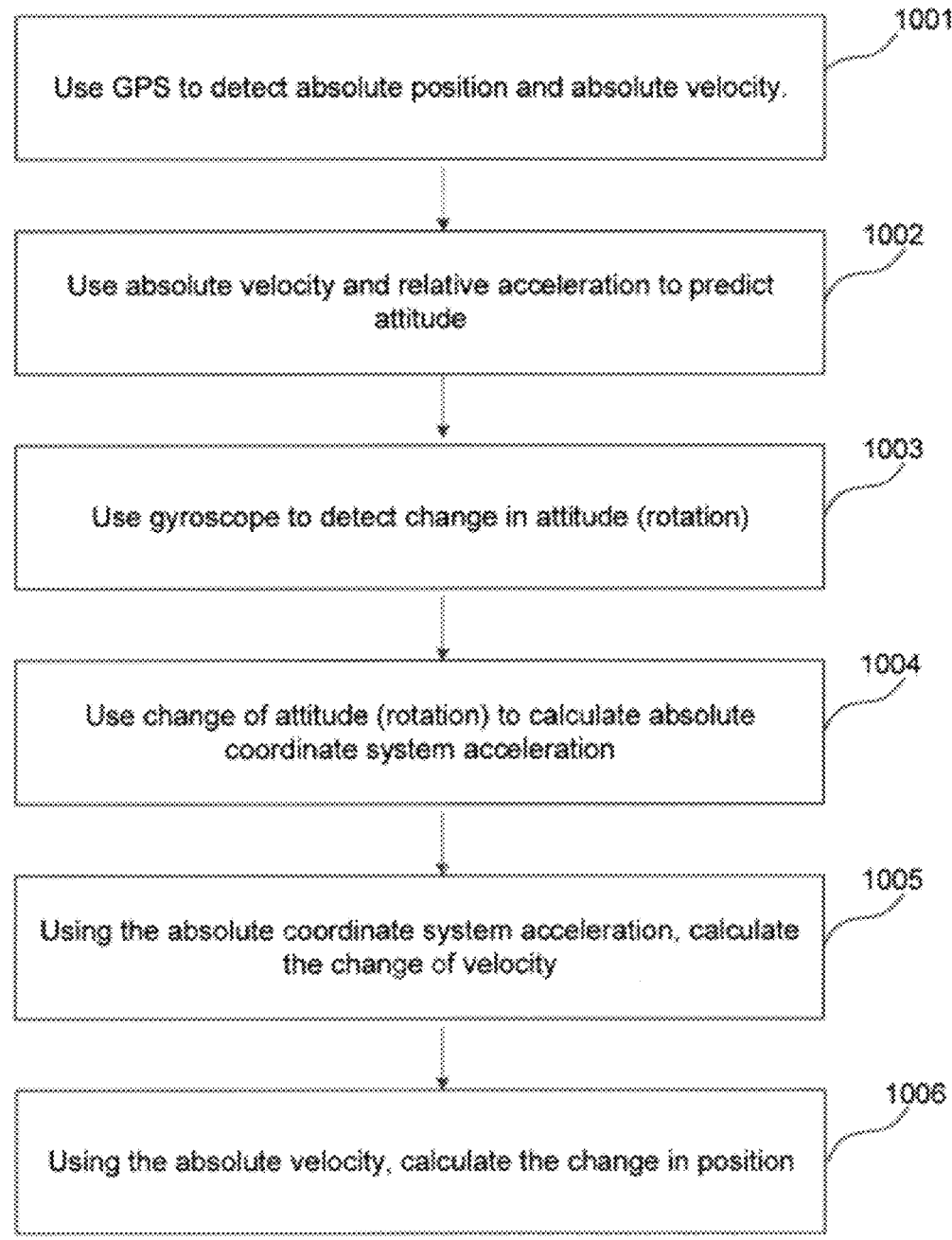
FIG. 10 is a flowchart diagram that shows the primary steps involved in using information from a GPS, an acceleration sensor, and a gyroscope to calculate an estimated position of a moving mobile device, according to an embodiment.

FIG. 10 is a flowchart diagram that shows the primary steps involved in using information from a GPS 801, a gyroscope 103, and an acceleration detector 102 to calculate an estimated position of a moving mobile device. In step 1001, the mobile device uses GPS 801 to detect absolute position 808 and absolute velocity 807 by standard GPS methods. In step 1002, the mobile device uses absolute velocity 807 and relative acceleration to predict attitude (see FIG. 5 and FIG. 6). In step 1003, the mobile device uses the gyroscope to detect change of attitude (rotation) (see FIG. 5 and FIG. 6). In step 1004, the mobile device uses the change of attitude (rotation) to calculate absolute coordinate system acceleration (see FIG. 5 and FIG. 6). In step 1005, the mobile device uses the absolute coordinate system acceleration to calculate the change of velocity (see FIG. 5 and FIG. 6). In step 1006 the mobile device uses the absolute velocity to calculate the change of position (using numerical integration). The inputs and outputs of these steps are discussed above in reference to FIG. 9.

Using a Kalman Filter Algorithm to Provide Position Estimates

In an embodiment, a Kalman filter algorithm is used as a technique to combine the input from the location sensor 101, acceleration 102, and gyroscope 103 to find a calculated position of the mobile device while controlling variance. The variance of a random variable or distribution is the squared deviation of that variable from its expected value or mean. It can be used as a measurement of accuracy by providing a probabilistic measure of how close an estimated value is likely to be to its expected value. The following formulas apply to variance:

Definitions:
1. E (Average, Mean or Expected Value)
2. u=E(x) (Average of x, where x is a random variable)
3. Basic Formula:

$$\text{Variance: } V(x)=E((x-u)^2)=E(x^2)-E(x)^2$$

Variance is a measure of how far a random variable is likely to deviate from its expected value, and can be used to control error by minimizing it.

4. Add Formula:

$$V(x+y)=V(x)+V(y)+2\text{Cov}(x,y)$$

When x is independent of y, Cov(x,y)=0

5. Multiply Formula:

$$V(xy)=E((xy)^2)=E(x^2+2xy+y^2)-(E(x)+E(y))^2$$

(while x and y are not related, with Cov(x,y)=0 Cov($x^2$, $y^2$)=0)

So we have (by algebraic manipulation):

$$E(xy) = E(x)E(y)$$
$$E((xy)^2) = E(x^2)E(y^2)$$
$$E((xy)^2) - E(xy)^2 =$$
$$E(x^2)E(y^2) - E(x)^2E(y)^2 = E(x^2)V(y) + E(x^2)E(y)^2 - E(x)^2E(y)^2 =$$
$$E(x^2)V(y) + V(x)E(y)^2 = V(x)V(y) + E(x)^2V(y) + V(x)E(y)^2$$

In our usage, we have:

$$=E(x)^2>>V(x), E(y)^2>>V(y)$$

So we should have:

$$V(xy)=E(x)^2V(y)+V(x)E(y)^2, \text{ because } V(x)V(y) \text{ is relatively small by comparison.}$$

Rotation Formula
Assume:

$$V_A=\Phi V_B$$

$\Phi$ is the rotation matrix, and $V_B$ is the original vector. The product of the rotation matrix with $V_B$ is the rotated version of $V_B$, which is $V_A$.

Use the Multiply formula and substitute to yield:

$$V(\Phi V_B)=E(\Phi)^2V(V_B)+V(\Phi)E(V_B)^2$$

For a matrix the definition of variance is:

$$V(\Phi)=E(\Phi\Phi^T)-E(\Phi)E(\Phi^T)$$

So change the $E(\Phi)$ into $E(\Phi\Phi^T)=|E(\Phi)|^2$

Because ($\Phi$) is the rotation matrix, the determinant $|E(\Phi)|$ is an identity matrix, so we have:

$$V(\Phi V_B)=V(V_B)V(\Phi)E(V_B)^2,$$

which is the result of substituting these calculations and identities into the Multiply Formula. This equation is referred to as the "Angle Error Calculation Formula".

This Angle Error Calculation Formula determines a measurement of the error introduced into a measurement involving a vector given the original vector and the rotation matrix that transforms it.

Integral Formula:
If we use $$\sum_{a}^{b} A_x \Delta x$$

to calculate:
$\int_a^b A_x dx$ (i.e., by using the sum of a series of small rectangles to approximate the area under the curve provided by $A_x$)

We should gain 2 variance sources:
The variance from $A_x$ (i.e., the uncertainty inherent to the numerical integration), using the add formula it should be (the variance from Numerical integration):

$$(b-a)\Delta x^{-1} V(A)\Delta x^2 = (b-a)V(a)\Delta x$$

The estimated error upper bound on the value of the definite integration is:

$$E \leq = \frac{(b-a)\Delta^2}{24} f''(\varepsilon)$$

To summarize, by algebraic rearrangement:

$$V\left(\int_a^b A(x)dx\right) = (b-a)V(a)\Delta x + \frac{(b-a)^2}{576}\Delta x^4 V(a''),$$

so when $\Delta x$ is small enough, the equation will be:

$$V(\int_a^b A(x)dx) = (b-a)V(a)\Delta x$$

The Kalman Filter Algorithm

The Kalman filter is essentially a set of mathematical equations that implement a predictor-corrector type estimator that is optimal in the sense that it minimizes the estimated error covariance when some presumed conditions are met for the state of a process that changes over time with measurements taken at an initial a priori and subsequent a posteriori measurements that can be combined to yield an intermediate value of the process.

Definitions:
1. H (Measure matrix): For Direct Measurement, it is always 1 or the identity matrix, so that no transformation is necessary to use the measured values.
2. P (Kalman method Variance): The precision of our result, as calculated by the Kalman Filter, for whichever variable is associated with P.
3. x (Kalman estimated value): A vector of system status, for position usage it should be (Lx, Ly, Lz), the coordinates of the position, referring to an estimate of a measured initial or subsequent value of the system.
$\hat{x}_{\overline{k}}$ reflects the new, estimated position of the mobile device, while $\hat{x}$ reflects the original position
4. R (The variance of the measured signals): For example, if the GPS told me my position has an error of ±25 m, that means R=(25 m)$^2$ Kalman Core Equations $$K_k = P_{\overline{k}} H^T (HP_{\overline{k}} H^T + R)^{-1} \qquad 1.$$

$$\hat{x}_k = \hat{x}_{\overline{k}} + K_k(Z_k - H\hat{x}_{\overline{k}}) \qquad 2.$$

$$P_k = (1 - K_k H) P_{\overline{k}} \qquad 3.$$

$Z_k - H\hat{x}_{\overline{k}}$ in equation 2 is the measurement innovation, or the residual, and it reflects the discrepancy between the predicted measurement $H\hat{x}_{\overline{k}}$ and the actual measurement $Z_k$.

$\hat{x}$ reflects the new, estimated position of the mobile device 105, while $\hat{x}_{\overline{k}}$ reflects the original position The n by m matrix $K_k$ in Kalman Core Equation 1 is chosen to be the gain or blending factor that minimizes the a posteriori error covariance $P_K$. As can be seen from Kalman Core Equation 1, the measurement error covariance R approaches zero, the gain K weights the residual more heavily, and $K_K$ approaches 1, causing Kalman Core Equation 3 to reflect a situation where $P_K = P_{\overline{k}}$.

$Z_k$ represents the actual measurement.

Equation 3 updates the error covariance to reflect a Kalman estimated variance that is in accordance with an optimized gain, as per Kalman Core Equation 1

To Calculate:
In our usage, we assume:
1. E (The increment variance) (For example, if the GPS signal gives ±25 m, and our MEMS acceleration sensor 102 told us we have traveled 30 m±0.2 m, then E should be (0.2 m)$^2$ The increment variance reflects the variance of the information obtained from the MEMS acceleration sensor 102.
2. H=1 (We measure signals directly) (Thus, all instances of H will be the identity matrix.)
3. P<<R (MEMS increment signals always have a higher precision than location sensor 101 hint signals)

So we obtain:
Because $P_K + E = P_{\overline{k}}$, we can get $K_K P_{\overline{k}} = E$ because we assume H=1 (see Core Kalman Equation 3 to reflect the increment variance)
So we have $K_K = P_{\overline{k}}(P_{\overline{k}} + R)^{-1}$ (see Core Kalman Equation 1, determining the optimized gain matrix)

$$P_{\overline{k}}^2 = (P_{\overline{k}} + R) \times E$$

(by algebraic rearrangement)
So, when R>>$P_{\overline{k}}$, we have $$P_{\overline{k}}^2 = RE,$$

by substitution, which in normal format is:
4. P$^2$=RE (the square of the Kalman variance is the product of the measured signal variance and the increment variance)

Error Estimation for Integration of Android Position Service

Definitions:
$R_x$: Variance of direct measured value x (Obtained from GPS)
$P_x$: Variance of a Kalman average value x (Calculated overall variance, using Kalman Core Equations)
$E_x$: Variance of difference measured value x (Obtained from accelerometer
$D_x$: Difference measured value x (Obtained by taking values at multiple points in time and determining variance)

Types of Value x:
L (Location)
VA (Velocity under absolute coordinate system)
VR (Velocity under relative coordinate system)
ATT (Attitude)
AA (Acceleration under absolute coordinate system)
AR (Acceleration under relative coordinate system)

Signal Sources, Procedure for Analysis/Error Estimation Steps:
Step 1. Use location sensor 101 to detect Kalman fusion of variance in absolute position 808 from the location sensor 101 and the MEMS sensors 104)

Step 2. Numerically integrate absolute velocity 807 information from the location sensor 101 to determine the location sensor's 101 contribution to absolute position 808.

Step 3. Use a Kalman filter to combine the variance due to the location sensor 101 and the variance due to the MEMS sensors 104 for absolute velocity 807

Step 4. Determine the MEMS 104 sensors' contribution to variance in absolute velocity 807 by numerically integrating the variance of absolute acceleration 809

Step 5: Use a Kalman filter to find the variance of absolute acceleration by combining the variance of attitude 812 with the square of relative acceleration 811 and the variance due to the increment from the gyroscope 103, using the angle error calculation formula Step 6. Find the Kalman variance of attitude by combining the contribution to attitude from the location sensor 101 and the accelerometer.

Step 7. Use the two variance sources of absolute velocity signal value, Signal from the absolute velocity detector, and the signal from the integral of absolute acceleration. combined with the angle error calculation formula to yield the variance in the attitude.

Step 8: Use the drift rate of the gyroscope 103 to calculate the variance in the attitude due to the gyroscope 103.

Error Estimation Step Equations:
1. (Step 1) $P_L=(R_L E_L)^{1/2}$ (by equation 4 and algebra)
Kalman filter fusino the GPS location and the MEMS detected location
2. (Step 2) $E_L=(T[?][?]dt)P_{VA}=TdtP_{VA}$ (Integrate the velocity (under the absolute coordinate system) to calculate the distance traveled by the numerical integration formula, transforming absolute velocity (VA) 807 data into a variance measure for position (L) 808)
3. (Step 3) $P_{VA}=(R_{VA}E_{VA})^{1/2}$ (by equation 4 and algebra)
4. (Step 4) $E_{VA}=(T \times dt)P_{AA}=TdtP_{AA}$ (by the numerical integration formula, providing $E_{VA}$ for Equation 3)
5. (Steps 5) $P_{AA}=P_{ATT}A^2+R_{AR}$ (by equation 1 and algebra)
6. (Step 6) $P_{ATT}=(R_{ATT}E_{ATT})^{1/2}$ (by equation 4 and algebra)
7. (Step 7) $R_{ATT}=P_{VA}/D_V{}^2=P_{VA}/(A \times T)^2$
8. (Steps 8) $E_{ATT}=T \times Drift_{Gyro}$ Estimation Formula According to a combination of equations 6-8 of Error Estimation, we have the Kalman Filter variance of the attitude as:

$$P_{ATT} = \left(\frac{Drift_{Gyro}P_{VA}}{A^2 T}\right)^{1/2}$$

So, if the $P_{ATT}A^2 \gg R_{AR}$ as per equation 5 of Error Estimation, it means the variance's main source is the attitude measurement, i.e. from the gyroscope 103. Otherwise, it means the variance of $P_{AA}$ comes primarily from the acceleration detector 102. If $P_{ATT}A^2 \gg R_{AR}$, we have $P_{AA}=P_{ATT}A^2$. According to equations 3 and 4 of Error Estimation, we have the equation $$P_{VA}=P_{VA}{}^{1/4}Drift_{Gyro}{}^{1/4}T^{1/4}dt^{1/2}A^{1/2}R_{VA}{}^{1/2}=P_{VA}=Drift_{Gyro}{}^{1/3}T^{1/3}dt^{2/3}A^{2/3}R_{VA}{}^{2/3}$$

So, it must have, by substitution and algebra:

$$Drift_{Gyro}{}^{2/3}T^{-1/3}dt^{1/3}A^{4/3}R_{VA}{}^{1/3} \gg R_{AR}$$

So we have:

$$P_{AA}=P_{ATT}A^2$$

when $$Drift_{Gyro}{}^{2/3}T^{-1/3}dt^{1/3}A^{4/3}R_{VA}{}^{1/3} \gg R_{AR}$$

and $$P_{AA}=R_{AR}$$

when $$Drift_{Gyro}{}^{2/3}T^{-1/3}dt^{1/3}A^{4/3}R_{VA}{}^{1/3} \ll R_{AR}$$

Example Performance

Parameters and Estimation
As sample parameters, let
1. $Drift_{Gyro}=10^{-4}$ (where 35 degrees drifted after one hour) the rate is:

$$\left(\frac{35 \times 2\pi}{360}\right)^2 / 3600 = 10^{-4}$$

2. $R_{AR}=P(5 \times 10^{-3}\, g)$ (1.1 LSB)/(256 LSB/G)
3. $dt=P(10^{-2}\, s)$ (Acceleration detector 102 frequency)
For Indoor Usage:
$R_L=P(20\, m)$
$R_{VA}=P(5\, cm/s)$
$A=0.1\, g$ (walking acceleration)
$V=1\, m/s$ (walking speed)
So we have $$Drift_{Gyro}{}^{2/3}T^{-1/3}dt^{1/3}A^{4/3}R_{VA}{}^{1/3}=6 \times 10^{-5}$$

$$R_{AR}=2.5 \times 10^{-3}$$

$P_{AA}=R_{AR}$ when $$Drift_{Gyro}{}^{2/3}T^{-1/3}dt^{1/3}A^{4/3}R_{VA}{}^{1/3} \ll R_{AR}$$

so we can get:

$$P_L=(dtT^{3/4})(R_{VA}R_{AR})^{1/4}R_L{}^{1/2}$$

This indicates, if $P_L=1$ (keep the position in the precision of 1 m), that we only need GPS data once every 100 seconds.
For Outdoor Usage:
$R_L=P(20\, m)$
$R_{VA}=P(5\, cm/s)$
$E_{ATT}=P(T^{1/2}{}_{10}{}^{-4})$
$A=0.5\, g$ (acceleration in car)
$V=30\, m/s$ (car speed)
So we now have $$Drift_{Gyro}{}^{2/3}T^{-1/3}dt^{1/3}A^{4/3}R_{VA}{}^{1/3}=5 \times 10^{-4}$$

$$R_{AR}=2.5 \times 10^{-3}$$

so we can get:

$$P_L=(dtT^{3/4})(R_{VA}R_{AR})^{1/4}R_L{}^{1/2}$$

This once again indicates, if $P_L=1$ (keep the position in the precision of 1 m), that we only need GPS data once every 100 seconds.

For example, according to FIG. 1B and the above variance calculation results, GMHLD only needs to request GPS signals once every 100 seconds (0.01 Hz) to gain precision accuracy within 1 meter. This 0.01 Hz mode is sufficient for GMHLD to attain the desired level of location-prediction accuracy, and this 0.01 Hz mode consumes less than ⅕ of the energy of the normal GPS mode operating at 10 Hz.

This technology can be applied to any mobile application that needs location information where the power consumption is a concern. These applications include but are not limited to: navigation systems on maps, tracking of mobile users, stores finding users, users finding nearby stores or points of interest, users finding users, or personal services catering to a specific location, such as providing coupons while the mobile user is standing in front of a certain store.

The Summary and Abstract sections may set forth one or more but not all exemplary embodiments of the subject of the present application as contemplated by the inventor(s), and thus, are not intended to limit the present invention and the appended claims in any way.

The subject of the present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the subject of the present application that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for providing accurate location information for a moving mobile device, the system comprising:
    a location sensor, coupled to the mobile device, that determines an absolute location of the mobile device at a first time;
    an acceleration detector, coupled to the mobile device, that determines an acceleration magnitude that corresponds to a speed of the mobile device at a time after the first time and before a second time occurring after the location sensor determines the absolute location;
    a gyroscope, coupled to the mobile device, that determines a direction of movement of the mobile device at a time after the first time and before the second time;
    a sensor fusion module that:
        determines an updated location of the mobile device based on the acceleration magnitude and direction of movement, the updated location relative to the absolute location, the updated location information representing the location of the mobile device at the second time more accurately than the absolute location that is determined by the location sensor; and
        determines information about an external environment of the mobile device at least based on information received from the location sensor; and
    a parameter setting module that sets parameters modifying operation of the location sensor, the acceleration detector and the gyroscope to optimize overall power consumption for a given operating accuracy, wherein the parameter setting module retrieves optimum parameter values from a closure database connected to the parameter setting module that stores initial values of the parameters, and the optimum parameter values are selected based on the initial values and the information about the external environment of the mobile device, the optimum parameter values optimizing overall power consumption for given operating accuracy.

2. The system of claim 1, further comprising a user input module that allows a user to set the operating accuracy used by the parameter setting module.

3. The system of claim 1, wherein the parameter setting module iteratively uses the Newton-Raphson method to optimize overall power consumption.

4. The system of claim 1, further comprising a sensor register that receives the parameters that have been optimized by the parameter setting module and transmits them to the location sensor, the acceleration detector, and the gyroscope to be implemented.

5. The system of claim 1, wherein the sensor fusion module uses a Kalman filter to determine the updated location information with increased accuracy by deriving an updated location based on a weighted average of information provided to the signal fusion module.

6. The system of claim 1, wherein the sensor fusion module uses numerical integration to transform acceleration information including the acceleration magnitude into velocity information and the velocity information into the updated location information.

7. The system of claim 1, wherein the location sensor is a GPS sensor, and wherein the acceleration detector and movement direction detector are MEMS devices.

8. The system of claim 1, further comprising an additional MEMS device that provides information about the position, orientation, or movement of the mobile device to the sensor fusion module for use in determining the updated location.

9. The system of claim 1, further comprising a data extraction module that receives measurement data from the sensor fusion module and filters the measurement data to provide signal object information that is characteristic of at least one of position, orientation, change of position, and change of orientation of the device.

10. The system of claim 9, further comprising using the data extraction module to filter relative information that is characteristic of at least one of position, orientation, change of position, and change of orientation of the device and transform the relative information into absolute information.

11. The system of claim 9, wherein the data extraction module corrects the output of the acceleration detector for the effects of gravity.

12. The system of claim 1, wherein the location sensor determines the absolute location of the mobile device with a location sensor accuracy that depends on the environment of the mobile device and power allocated to the location sensor, and wherein the parameter setting module is further configured to dynamically allocate power resources by increasing or decreasing the power allocated to the acceleration detector or the gyroscope to achieve a given operating accuracy when the location sensor accuracy changes, based on changes to the environment of the mobile device, while optimizing overall power consumption.

13. The system of claim 12, wherein the parameter setting module is configured to dynamically allocate power resources by:
    identifying an environmental change in which the mobile device changes from an outside environment to an indoor environment, wherein the location sensor accuracy decreases without changing power allocated to the location sensor; and increasing power allocated to the acceleration detector or the gyroscope to preserve operating accuracy while optimizing overall power consumption.

14. The system of claim 12, wherein the parameter setting module is configured to dynamically allocate power resources by:
identifying an environmental change in which the mobile device changes from an indoor environment to an outside environment, wherein the location sensor accuracy increases without changing power allocated to the location sensor; and
decreasing power allocated to the acceleration detector or the gyroscope to preserve operating accuracy while optimizing overall power consumption.

15. A computer-implemented method for providing accurate location information for a moving mobile device, the method comprising:
determining, using a location sensor coupled to the mobile device, an absolute location of the mobile device at a first time;
determining, using an acceleration detector coupled to the mobile device, an acceleration magnitude of the mobile device at a time after the first time and before a second time occurring after the location sensor determines the absolute location;
determining, using a gyroscope coupled to the mobile device, a direction of movement of the mobile device at a time after the first time and before the second time;
determining an updated location of the mobile device based on the acceleration magnitude and direction of movement, the updated location relative to the absolute location, the updated location information representing the location of the mobile device at the second time more accurately than the absolute location that is determined by the location sensor;
determining information about an external environment of the mobile device at least based on information received form the location sensor; and
setting parameters modifying operation of the location sensor, the acceleration detector and the gyroscope to optimize overall power consumption for a given operating accuracy, wherein the setting comprises retrieving optimum parameter values from a closure database that stores initial values of the parameters, and the optimum parameter values are selected based on the initial values and the information about the external environment of the mobile device, the optimum parameter values optimizing overall power consumption for a given operating accuracy.

16. The computer-implemented method of claim 15, further comprising using user input to set the operating accuracy used by the parameter setting module.

17. The computer-implemented method of claim 15, wherein the optimizing comprises iteratively using the Newton-Raphson method to optimize overall power consumption.

18. The computer-implemented method of claim 15, further comprising:
receiving, by a sensor register, the parameters that have been optimized by the parameter setting module and transmitting them to the location sensor, the acceleration detector, and the gyroscope to be implemented.

19. The computer-implemented method of claim 15, further comprising: using a Kalman filter to determine the updated location information with increased accuracy by deriving an updated location based on a weighted average of information provided to the signal fusion module.

20. The computer-implemented method of claim 15, further comprising: using numerical integration to transform acceleration information including the acceleration magnitude into velocity information and the velocity information into the updated location information.

21. The computer-implemented method of claim 15, wherein the location sensor is a GPS sensor, and wherein the acceleration detector and movement direction detector are MEMS devices.

22. The computer-implemented method of claim 15, further comprising:
using an additional MEMS device to provide information about at least one of the position, orientation, movement of the mobile device to the sensor fusion module for use in determining the updated location.

23. The computer-implemented method of claim 15, further comprising:
receiving measurement data from the sensor fusion module; and
filtering the measurement data to provide signal object information that is characteristic of at least one of position, orientation, change of position, and change of orientation of the device.

24. The computer-implemented method of claim 23, further comprising:
filtering, relative information that is characteristic of at least one of position, orientation, change of position, and change of orientation of the device; and
transforming the relative information into absolute information.

25. The computer-implemented method of claim 23, further comprising:
correcting, the output of the acceleration detector for the effects of gravity.

26. The computer-implemented method of claim 15, wherein determining the absolute location of the mobile device has a location sensor accuracy that depends on the environment of the mobile device and power allocated to the location sensor, and wherein the dynamically allocating power resources comprises increasing or decreasing the power allocated to the acceleration detector or the gyroscope to achieve a given operating accuracy when the location sensor accuracy changes, based on changes to the environment of the mobile device, while optimizing overall power consumption.

27. The computer-implemented method of claim 26, wherein dynamically allocating power resources comprises:
identifying an environmental change in which the mobile device changes from an outside environment to an indoor environment, wherein the location sensor accuracy decreases without changing power allocated to the location sensor; and
increasing power allocated to the acceleration detector or the gyroscope to preserve operating accuracy while optimizing overall power consumption.

28. The computer-implemented method of claim 26, wherein dynamically allocating power resources comprises:
identifying an environmental change in which the mobile device changes from an indoor environment to an outside environment, wherein the location sensor accuracy increases without changing power allocated to the location sensor; and
decreasing power allocated to the acceleration detector or the gyroscope to preserve operating accuracy while optimizing overall power consumption.

* * * * *